(12) United States Patent
Hwang

(10) Patent No.: US 6,839,879 B1
(45) Date of Patent: Jan. 4, 2005

(54) METHOD AND SYSTEM FOR TIME-STAMPING AND MANAGING ELECTRONIC DOCUMENTS

(75) Inventor: L. James Hwang, Menlo Park, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/307,620

(22) Filed: May 7, 1999

(51) Int. Cl.[7] .............................................. G06F 17/00
(52) U.S. Cl. ...................................... 715/511; 707/7
(58) Field of Search ............................ 715/511, 501.1, 715/513; 707/7, 501.1, 513, 511, 203, 204; 713/176–178; 380/51

(56) References Cited

U.S. PATENT DOCUMENTS

| | | | |
|---|---|---|---|
| 5,136,647 A | | 8/1992 | Haber et al. ................... 380/49 |
| 5,373,561 A | | 12/1994 | Haber et al. ................... 380/49 |
| 5,897,643 A | * | 4/1999 | Matsumoto ................. 707/511 |
| 5,912,974 A | | 6/1999 | Holloway et al. ............ 380/51 |
| 5,923,763 A | * | 7/1999 | Walker et al. ................. 380/51 |
| 5,940,594 A | * | 8/1999 | Ali et al. ............... 395/200.33 |
| 6,006,227 A | * | 12/1999 | Freeman et al. ................ 707/7 |
| 6,023,710 A | * | 2/2000 | Steiner et al. .............. 707/204 |
| 6,182,219 B1 | * | 1/2001 | Feldbau et al. ............. 713/176 |
| 6,185,576 B1 | * | 2/2001 | McIntosh .................... 707/200 |
| 6,188,766 B1 | * | 2/2001 | Kocher ........................ 380/246 |
| 6,199,052 B1 | * | 3/2001 | Mitty et al. .................... 705/75 |
| 6,209,090 B1 | * | 3/2001 | Aisenberg et al. ............. 713/28 |
| 6,237,096 B1 | * | 5/2001 | Bisbee et al. ................ 713/178 |
| 6,327,656 B2 | * | 12/2001 | Zabetian ...................... 713/176 |
| 6,351,812 B1 | * | 2/2002 | Datar et al. .................. 713/182 |
| 6,366,933 B1 | * | 4/2002 | Ball et al. .................... 707/511 |
| 6,393,566 B1 | * | 5/2002 | Levine ........................ 713/178 |
| 6,401,118 B1 | * | 6/2002 | Thomas ....................... 709/224 |
| 6,411,716 B1 | * | 6/2002 | Brickell ....................... 380/286 |

OTHER PUBLICATIONS

Dave Trowbridge, "Imagine a Notary Stamp for Electronic Documents", Computer Technology Review, vol. XV, No. 4, Apr. 1995, 2 pages.
Stuart Haber & W. Scott Stornetta, Bellcore, "Foiling the Forgers", Discover, vol. 13, No. 10, Oct. 1992, 2 pages.
Stuart Haber & W. Scott Stronetta, Bellcore, "How to Time–Stamp a Digital Document", DIMACS Technical Report 90–80, Dec. 1990, pp. 1–18.

* cited by examiner

Primary Examiner—Sanjiv Shah
(74) Attorney, Agent, or Firm—LeRoy D. Maunu

(57) ABSTRACT

A method and system for time-stamping and managing electronic documents are described. A document manager obtains time-stamp certificates for the electronic documents. Document identifiers and associated certificate identifiers for the documents and certificates are used to build a database, and the documents and the certificates are stored for future reference.

21 Claims, 4 Drawing Sheets

METHOD AND SYSTEM FOR TIME-STAMPING AND MANAGING ELECTRONIC DOCUMENTS

FIELD OF THE INVENTION

The present invention generally relates to management of electronic documents, and more particularly to time-stamping and managing electronic documents.

BACKGROUND OF THE INVENTION

Various situations require verifying the date on which a document was created. For example, log books, journals, diaries, and engineering notebooks have information that is time sensitive. That is, the date and time at which the information was documented may be important for regulatory compliance or for evidentiary purposes.

The advent of electronic documents, for example, word processing documents, appears to have complicated rather than simplified the management of time sensitive documents. Since electronic documents are easily modified, often without evidence of having been changed, it may be desirable to print, time-stamp, and archive a document to preserve evidence of the document's authenticity. Thus, while the characteristics of electronic documents enable quick production and modification, electronic documents may require a redundant process for archival.

U.S. Pat. No. 5,136,647, entitled, "Method for Secure Time-Stamping of Digital Documents" to Haber et al. and issued on Aug. 4, 1992 is incorporated herein by reference. U.S. Pat. No. 5,136,647 addresses some problems related to the certification of electronic documents. The process of U.S. Pat. No. 5,136,647 generally entails generating a certificate as a function of the data comprising the document, the current time, and an assortment of additional data that is described in the patent. The electronic document and certificate can then be stored for later reference, and the authenticity of the electronic document can be later verified by using the stored electronic document and the certificate as described in the patent.

The method described in U.S. Pat. No. 5,136,647 appears to provide a viable solution to the problem of certification of electronic documents. However, as recognized with the present invention, various situations require more than certification of electronic documents. For example, journals, diaries, and engineering notebooks will likely involve generating multiple electronic documents. Thus, archiving the documents and certificates in a manner that provides for easy retrieval may be cumbersome. To further complicate matters, an organization may have many people generating their own electronic documents for journals, diaries, and notebooks, and the documents may have various relationships. Thus, the present invention recognizes the deficiencies of present systems for convenient cataloging and fast identification and retrieval of related documents and their associated certificates. A method and system that address the aforementioned problems, as well as other related problems, are therefore desirable.

SUMMARY OF THE INVENTION

In various embodiments, the invention provides for time-stamping and managing electronic documents. The present method provides a database in which the documents are associated with corresponding time-stamp certificates. Thus, not only can a plurality of documents and their associated time-stamp certificates be easily tracked and retrieved, but various relationships can be established between the documents. For example, in the various embodiments, documents can be related both by subject and chronologically.

In accordance with one embodiment, a method is provided for time-stamping and managing electronic documents. The method comprises obtaining respective time-stamp certificates for a plurality of documents, the documents and the certificates having associated identifiers. A database is built using the document identifiers and associated certificate identifiers, and the documents and the certificates are stored for later reference.

In another embodiment, a system is provided for time-stamping and managing electronic documents. The system comprises a document manager, a certificate generator, and a database. The document manager is configured and arranged to generate requests for time-stamp certificates for electronic documents, store the documents and corresponding time-stamp certificates, and generate document identifiers and certificate identifiers that respectively correspond to the documents and time-stamp certificates. The certificate generator is coupled to the document manager, and is configured and arranged to generate time-stamp certificates in response to the requests from the document manager. Associations of document identifiers and certificate identifiers that are generated by the document manager are stored in the database.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Various aspects and advantages of the invention will become apparent upon review of the following detailed description and upon reference to the drawings, in which.

Figure 1:
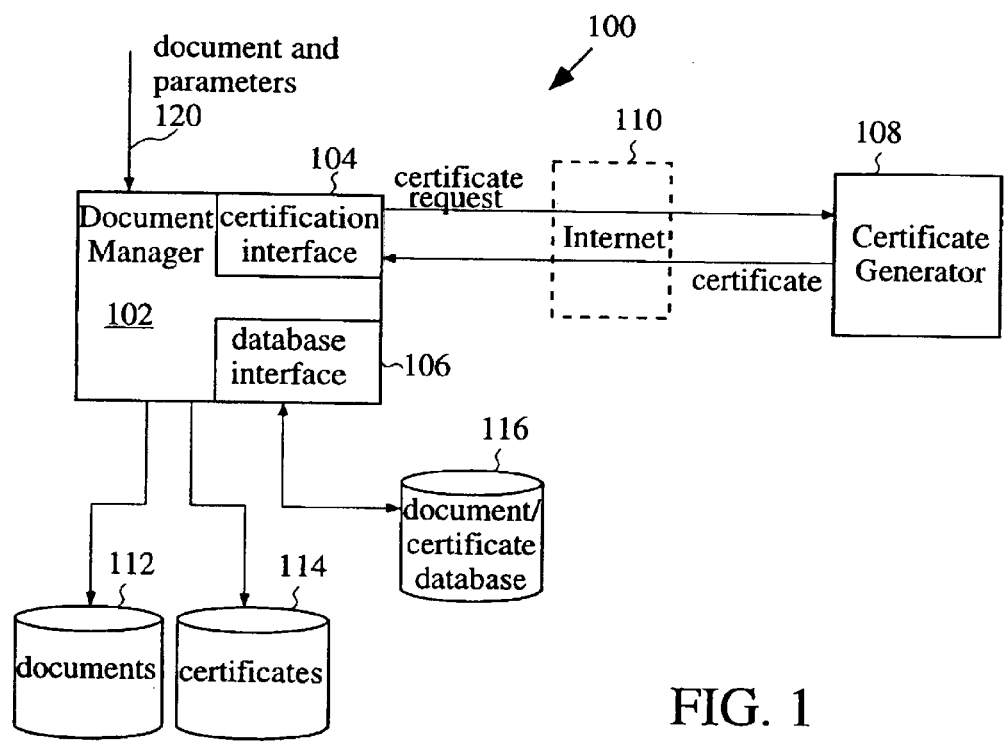
FIG. 1 is a block diagram of an example system for management of time-stamping and certifying electronic documents in accordance with one embodiment of the invention.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE DRAWINGS

The present invention is believed to be applicable to a variety of systems for time-stamping and managing electronic documents. An "electronic document", as the term is used in this specification, is generally comprised of logically related data. Common examples include, but are not limited to, a word processing file, a spreadsheet file, a digital image file, a digital audio file, a digital video file, and even a database file. Those skilled in the art will appreciate that the present invention is applicable to other types of files in addition to the aforementioned examples. Generally, an electronic document may be viewed as a snapshot of a set of data at a given instant.

In accordance with the example embodiments described herein, selected documents are time-stamped by obtaining respective time-stamp certificates, the time-stamped versions of the documents are stored along with the associated certificates, and the documents and certificates are associated in a database. The associations created for the documents and certificates are useful in applications where there are numerous documents to certify and track. For example, journals, log books, and engineering notebooks may include time-sensitive entries for which authentication is desirable or necessary.

FIG. 1 is a block diagram of an example system for management of time-stamping and certifying electronic documents in accordance with one embodiment of the invention. System 100 includes document manager 102 having certification interface 104 and database interface 106. Document manager 102 is coupled to certificate generator 108 via network 110, which is, for example, a wide area network such as the Internet. Documents and certificates that are stored by document manager 102 are illustrated as storage elements 112 and 114, respectively. It will be appreciated that storage elements 112 and 114 are separate for purposes of illustration only, and that documents and certificates could be stored together or separately on one or more devices using conventional file storage techniques. Document manager 102 is also coupled to database 116 via database interface 106.

Document manager 102 receives as input a document and associated parameters, as illustrated by line 120. The document is packaged with a certification request by certification interface 104 and sent to certificate generator 108. Digital Notary™ software from Surety Technologies can be used, for example, for certificate interface 104 and certificate generator 108. ("Digital Notary" is a trademark of Surety Technologies.) Certification interface 104 applies a one-way hash function to generate a digital fingerprint that is transmitted to certificate generator 108. Certificate generator 108 generates a time-certified digital certificate that seals the document and returns the certificate to the requester. U.S. Pat. No. 5,136,647 further describes the example certification method. Other time-stamping and certification methodologies recognized by those skilled in the art may also be used in accordance with the present invention.

Having received the certificate from certificate generator 108, document manager 102 stores the document and certificate so that they can be examined at a later time if the need arises. In addition, a document identifier and certificate identifier are associatively stored in database 116. The database association enables fast retrieval of the document and associated certificate should the need arise to verify the authenticity of the document. In one embodiment, in addition to the document identifier and certificate identifier, database 116 also includes an associated time-stamp, subject, description, and a thread to chronologically link a document to other related documents. Thus, database 116 provides easy perusal of the various documents and the associated time-stamps, descriptions, and subjects, as well as relationships between the documents. Various conventional database systems, such as Microsoft Access, are suitable to implement database 116.

System 100 includes an outside agency, i.e., certificate generator 108, that provides the time-stamp certificate. However, it will be appreciated that in an alternative embodiment, the certificate generator could be integrated with the functionality of the document manager.

Document manager 102 can be implemented in a client-server arrangement or as a stand-alone personal computer. Thus, documents can be managed for a single or multiple users, depending upon application requirements.

Figure 2:
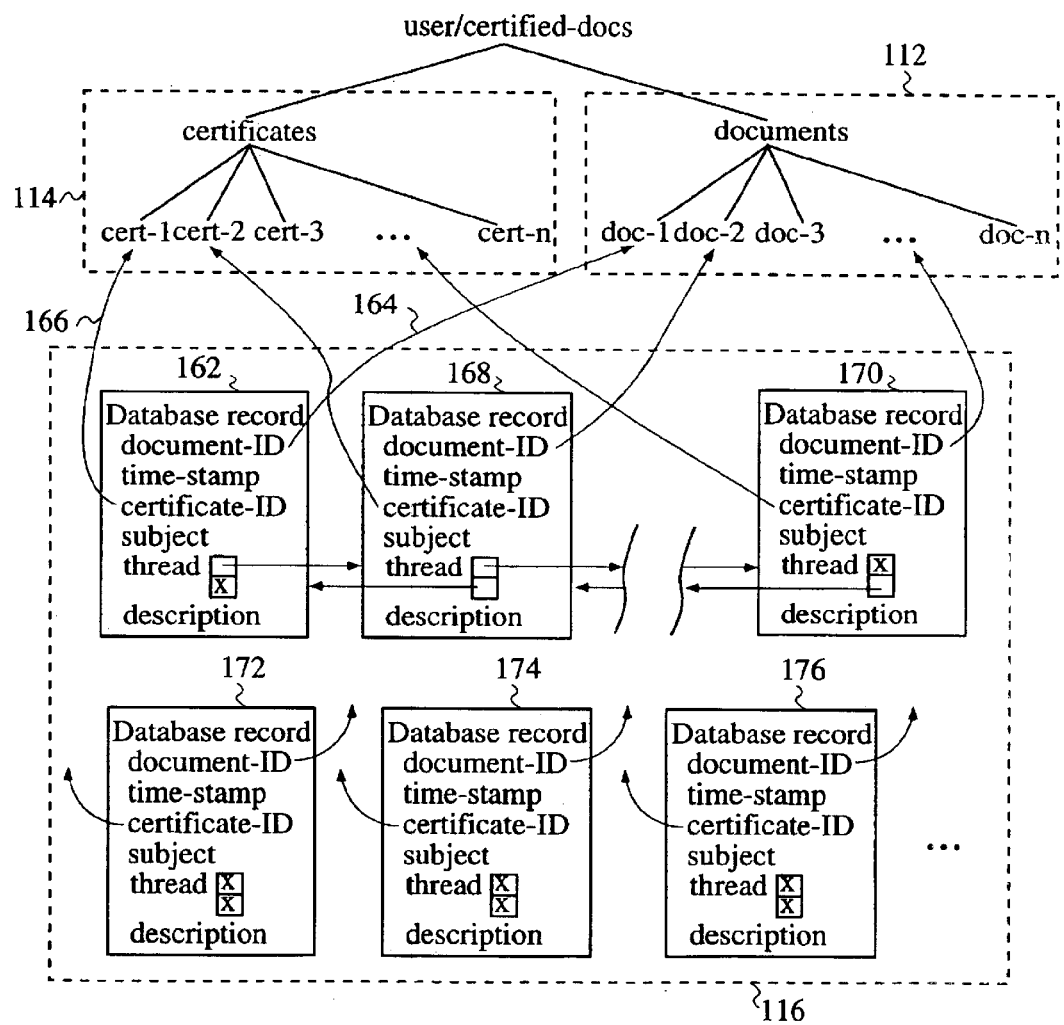
FIG. 2 illustrates the relationship between database records and documents and certificates stored for a particular user.

FIG. 2 illustrates the relationship between records of database 116 and documents and certificates stored for a particular user. An example hierarchy of certificates and documents is shown in the upper portion of FIG. 2, and an example set of database records from database 116 is depicted as blocks in the lower portion of FIG. 2. There is a one-to-one correspondence between each database record and a document/certificate pair. For example, record 162 is associated with document "doc-1" and certificate "cert-1". Note that line 164 indicates that the document-ID field references doc-1, and line 166 indicates that the certificate-ID field references cert-1. Records 168 and 170 reference the certificates and documents as shown. It will be appreciated that records 172, 174, and 176 reference other ones of the certificates and documents, even though the directional lines are not connected to the specific certificates and documents. The directional lines for records 172–176 are not connected to the certificates and documents so as not to clutter the diagram.

In addition to the document-ID and certificate-ID, each database record also includes a time-stamp, subject, description, and thread. The time-stamp can be generated by the document manager when the document is submitted for certification and can include the date and time. The subject is supplied by the user for the purpose of categorizing related documents. For example, the subject may be a project designation, an event designation, a technology designation, or any other designation suitable to the subject matter of the certified documents. The description can be a textual description of the document, for example.

The thread field of a database record is used to chronologically link the document to other related documents. For example, records 162–170 are linked with the thread fields as indicated by the directional lines. Note that each of the records has a forward link and a backward link, and that a thread has a first record and a last record. Specifically, record 162 is the first record in the thread, and record 170 is the last record in the thread. Thus, document "doc-1" is the first document in the example thread, document "doc-2" is the second document in the thread, and one of the documents between doc-3 and doc-n is the last document in the thread. The forward and backward links in the thread field enable forward and backward traversal of documents in a thread. Note that the backward link for the thread field of record 162 is null, as indicated by the "X" (because record 162 is the first record in the thread), and the forward link for the thread field of record 170 is null (because record 170 is the last record in the thread). The order in which documents are linked to the thread indicates the relative time at which time-stamp certificates were generated for the respective documents, and the documents were added to the thread. Suitable implementations for threading the time-stamped documents can be found in various e-mail, chat-room, and bulletin board systems.

While records 162–176 are shown as referencing documents and certificates for a single user, it will be appreciated that a single database could be constructed to associate documents and certificates for multiple users. In particular, multiple users could use the same set of subjects and threads when adding documents to the database, thereby providing links between the documents of different users. Various security levels could also be implemented so that selected users would have access to selected subjects and threads.

Figure 3:
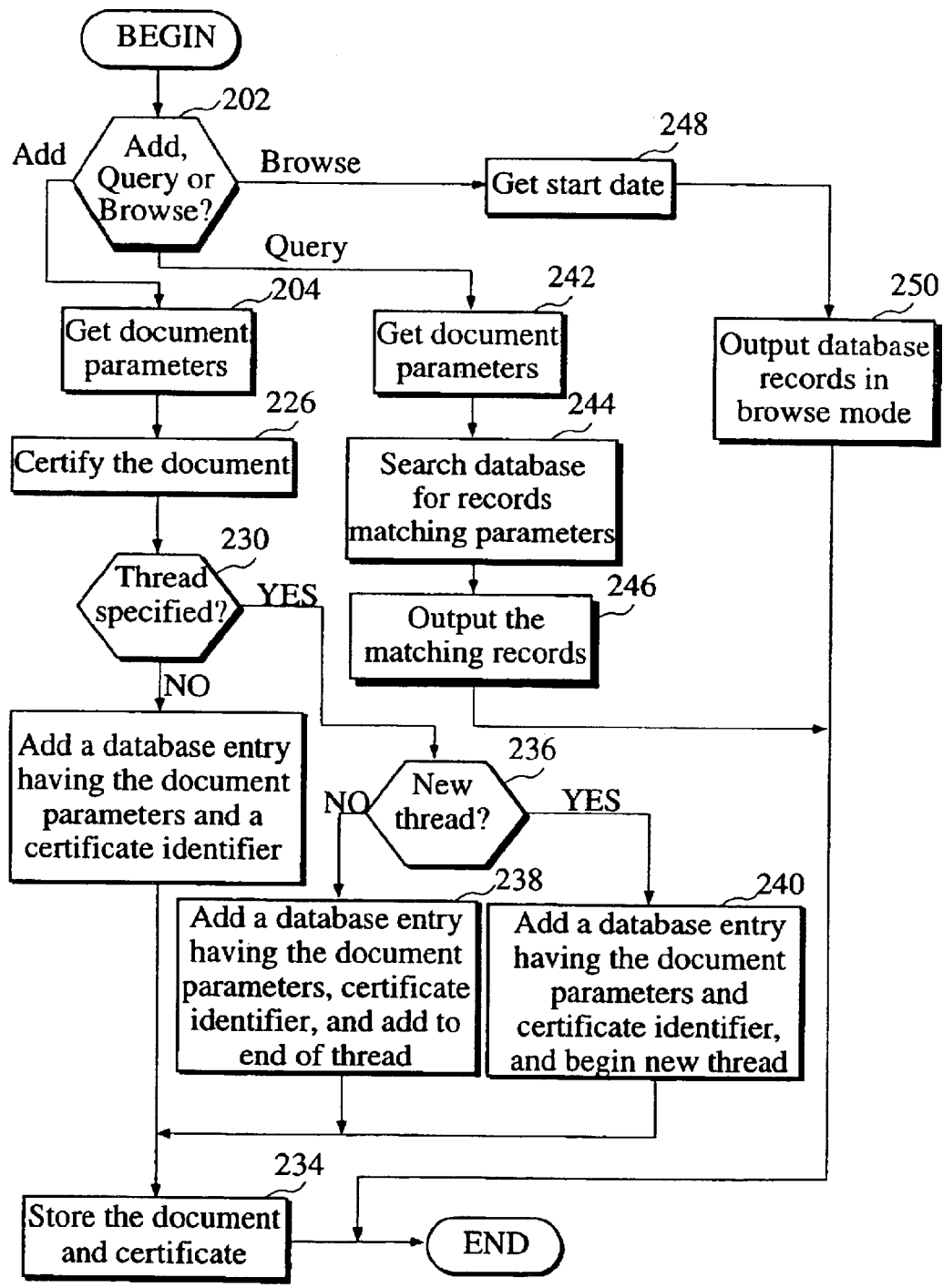
FIG. 3 is a flowchart of processing performed by a document manager in accordance with an example embodiment of the invention.

FIG. 3 is a flowchart of processing performed by document manager 102 in accordance with an example embodiment of the invention. Document manager 102 provides three user-selectable example functions: add, query, and browse. The functions can be made accessible with a point-and-click, menu, or command based interface.

Figure 4A:
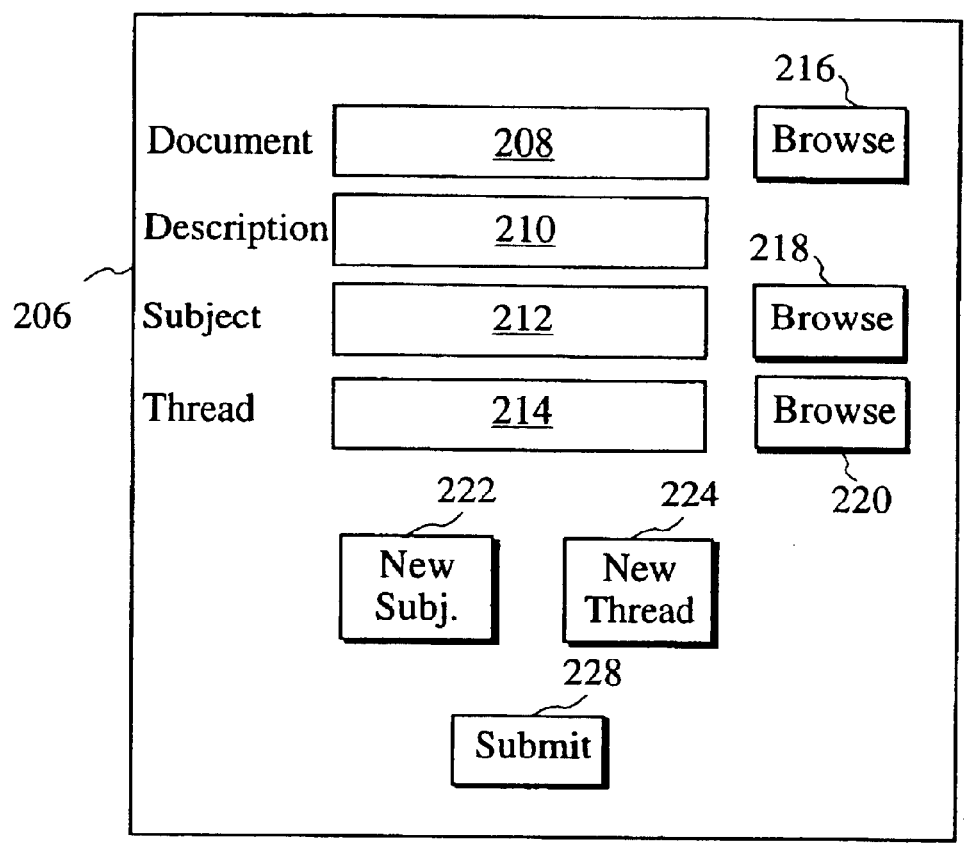
FIG. 4A shows an example dialog box used to obtain document parameters.

For the add function, step 202 directs control to step 204 to obtain the parameters for the document to add to database 116 (FIG. 1). Before continuing with the process of FIG. 3, FIG. 4A shows an example dialog box 206 used to obtain document parameters for the add function and is described in the following paragraphs.

Dialog box 206 includes data entry fields 208, 210, 212, and 214 for the user to enter a document identifier, a description, a subject, and a thread identifier, respectively. Data entry fields 208–214 correspond to the database fields described above for FIG. 2. Dialog box 206 also includes browse buttons 216, 218, and 220 that are associated with the document, subject, and thread fields 208, 212, and 214, respectively. Document manager 102 allows the user to navigate a hierarchy of files (not shown) that are accessible to the user in response to selection of browse button 216. In the browse mode, the user can select the desired document by clicking on a document identified in a list of documents, for example. A comparable browse capability is provided by the various operating systems from Sun Microsystems, Inc. of Palo Alto, Calif., Apple Computer, Inc. of Cupertino, Calif., and Microsoft Corporation of Redmond, Wash.

When the user selects browse button 218, document manager 102 presents a list of subjects defined in database 116, for example. This button allows the user to associate the document to be certified with a previously defined subject. For example, an engineer can create a document to describe an invention related to a particular project, product, or technology. If particular projects, products, and technologies have been previously created, the engineer can browse the subjects and make the desired selection. To create a new subject, button 222 is provided. Document manager 102 solicits a subject name from the user in response to selection of button 222, for example, with another dialog box. While not shown, it will be appreciated that a database table for all the subjects in database 116 may be desirable.

When the user selects browse button 220, document manager 102 presents a list of threads defined in database 116, for example. This button allows the user to link the document to be certified to previously certified documents. For example, an engineer can create a document that describes various refinements to an invention. If the invention has been previously described in one or more documents that have been linked by a thread, the most recent document can be appended to the thread by browsing and selecting the desired thread. It is expected that threads have names that reflect a theme common to the linked documents, for example, a name or number that identifies an invention. To create a new thread, button 224 is provided. Document manager 102 solicits a thread identifier from the user in response to the selection of button 224, for example, with another dialog box. While not shown, it will be appreciated that a database table for all the threads in database 116 may be desirable, and that each thread in the table references the first record (e.g., 162 of FIG. 2) in the thread.

Document manager 102 continues processing at step 226 of FIG. 3 when submit button 228 (FIG. 4A) is selected. The document is certified at step 226. As described above, document manager 102 can certify the document with locally provided functionality or can have the document certified by an outside agency, which may be preferable if the document and certification may eventually be used as objective evidence.

If no thread was specified in dialog box 206, step 230 directs control to step 232 where a database record is added for the document, certificate, and subject and description parameters if specified. The document and certificate are then stored at step 234, for example in accordance with the file system hierarchy shown in FIG. 2. Centralized storage may be desirable for documents and certificates in a network-based system 100 where multiple users interface with document manager 102. After the document and certificate have been stored, the process is complete.

If a user specified a thread for a document, step 230 directs control to decision step 236. For a thread that already exists in database 116, a record is added to the database for the document, certificate, and subject and description parameters if specified, as shown by step 238. The added record is linked to the end of the specified thread (see, for example, record 170 of FIG. 2). Processing continues at step 234 as described above.

Decision step 236 directs control to step 240 if the document is to begin a new thread. For the first document in a thread, the database record is referenced by a thread identifier to indicate that the document is the first. As set forth above, a separate table may be desirable for the various thread identifiers. Processing then continues at step 234 as described above.

If the user selects a query function, decision step 202 directs control to step 242, where document manager 102 obtains the parameters to be used in searching database 116. The parameters can be one or more of the parameters illustrated in dialog box 206 of FIG. 4A. Conventional methods can be used to search database 116 for matching records (step 244) and output the results (step 246).

Figure 4B:
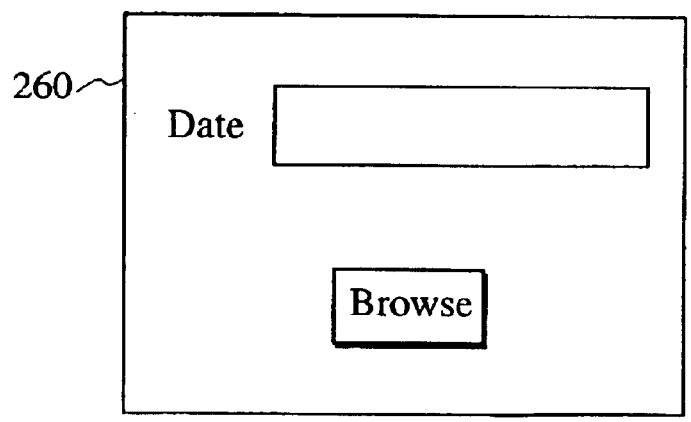
FIG. 4B shows an example dialog box used to obtain a date for browsing documents.

If the user selects the browse option, decision step 202 directs control to step 248, where document manager 102 determines the earliest date of interest. This date can be determined as illustrated in dialog box 260 of FIG. 4B. The default date is the earliest date corresponding to a record in the database. The process is then directed to step 250 where the user is presented with a list of documents in chronological order, beginning with the date of interest.

The user may select a desired document from the chronologically sorted list of records by clicking on a document identified in the list.

Accordingly, the present invention provides, among other aspects, a method and system for time-stamping and managing electronic documents. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for time-stamping and managing electronic documents, comprising:
obtaining respective time-stamp certificates for a plurality of documents, the documents and the certificates having associated identifiers;

building a database of document identifiers and associated certificate identifiers; and storing the documents and the certificates.

2. The method of claim 1, further comprising chronologically linking related documents by date and time of certification.

3. The method of claim 1, further comprising constructing chronologically ordered sets of documents in accordance with user specified relationships.

4. The method of claim 3, further comprising associating a time-stamp with the document identifiers in the database.

5. The method of claim 1, further comprising:

reading textual description information pertaining to the documents; and associating the description information with the document identifiers in the database.

6. The method of claim 1, further comprising associating a subject with the document identifiers in the database.

7. The method of claim 1, further comprising obtaining the certificates from an outside agency.

8. The method of claim 1, further comprising soliciting from a user a document identifier for a document to certify.

9. The method of claim 8, further comprising presenting a browse mode to a user for selection of the document to certify.

10. The method of claim 8, further comprising soliciting from a user a description of the document to certify.

11. The method of claim 8, further comprising soliciting from a user a subject to associate with the document to certify.

12. The method of claim 11, further comprising presenting a browse mode to a user for selection of the subject.

13. The method of claim 12, further comprising creating a new subject in response to user input.

14. The method of claim 8, further comprising soliciting from a user a thread identifier to associate with the document.

15. The method of claim 14, further comprising presenting a browse mode to a user for selection of the thread.

16. The method of claim 15, further comprising creating a new thread in response to user input.

17. A system for time-stamping and managing electronic documents, comprising:

a document manager configured and arranged to generate requests for time-stamp certificates for electronic documents, store the documents and corresponding time-stamp certificates, and generate document identifiers and certificate identifiers that respectively correspond to the documents and time-stamp certificates;

a certificate generator coupled to the document manager, and configured and arranged to generate time-stamp certificates in response to the requests from the document manager; and a database coupled to the document manager and including associations of document identifiers and certificate identifiers generated by the document manager.

18. The system of claim 17, further comprising a certification interface coupled to the document manager and further coupled to the certificate generator via a network, and configured and arranged to transmit the requests from the document manager to the certificate generator and the time-stamp certificates from the certificate generator to the document manager.

19. The system of claim 17, wherein the database further includes associations of subjects with the document identifiers.

20. The system of claim 17, wherein the database further includes one or more threads indicating chronological relationships between the documents.

21. The system of claim 17, wherein the database further includes:

associations of subjects with the document identifiers;

one or more threads indicating chronological relationships between the documents:

textual descriptions of the documents; and time-stamps for the documents.

* * * * *